United States Patent
Chen et al.

(10) Patent No.: US 7,277,132 B2
(45) Date of Patent: Oct. 2, 2007

(54) METHOD FOR MOTION VECTOR DE-INTERLACING

(75) Inventors: Yueyong Chen, Taipei (TW); Jian Zhu, Taipei (TW)

(73) Assignee: Ali Corporation, Taipei (TW)

( * ) Notice: Subject to any disclaimer, the term of this patent is extended or adjusted under 35 U.S.C. 154(b) by 645 days.

(21) Appl. No.: 10/865,810

(22) Filed: Jun. 14, 2004

(65) Prior Publication Data

US 2005/0163219 A1     Jul. 28, 2005

(30) Foreign Application Priority Data

Jan. 13, 2004  (TW)  ............... 93100846 A

(51) Int. Cl.
    H04N 7/01    (2006.01)
(52) U.S. Cl. .............. 348/448; 348/452; 348/451; 348/699
(58) Field of Classification Search ............ 348/448, 348/452, 451, 458, 459, 699, 700, 416.1, 348/420.1, 441; 382/236; 375/240.16
    See application file for complete search history.

(56) References Cited

U.S. PATENT DOCUMENTS

| | | | |
|---|---|---|---|
| 6,034,733 A * | 3/2000 | Balram et al. .............. | 348/448 |
| 6,269,484 B1 | 7/2001 | Simsic et al. | |
| 6,317,165 B1 * | 11/2001 | Balram et al. .............. | 348/699 |
| 6,348,949 B1 * | 2/2002 | McVeigh ................... | 348/452 |
| 6,459,455 B1 * | 10/2002 | Jiang et al. ................. | 348/452 |
| 6,577,345 B1 * | 6/2003 | Lim et al. ................... | 348/452 |
| 6,606,126 B1 * | 8/2003 | Lim et al. ................... | 348/452 |
| 6,614,441 B1 * | 9/2003 | Jiang et al. ................. | 345/539 |
| 6,614,484 B1 * | 9/2003 | Lim et al. ................... | 348/448 |
| 6,661,464 B1 * | 12/2003 | Kokkosoulis et al. ....... | 348/448 |
| 6,670,996 B2 * | 12/2003 | Jiang ......................... | 348/558 |
| 6,680,752 B1 * | 1/2004 | Callway et al. ............. | 348/448 |
| 6,686,923 B2 * | 2/2004 | Ji et al. ...................... | 345/606 |
| 6,690,427 B2 * | 2/2004 | Swan ......................... | 348/448 |
| 6,788,312 B1 * | 9/2004 | Azar et al. .................. | 345/694 |
| 6,970,206 B1 * | 11/2005 | Swan et al. ................. | 348/448 |
| 7,057,665 B2 * | 6/2006 | Jung et al. .................. | 348/452 |
| 7,139,002 B2 * | 11/2006 | Estrop ........................ | 345/501 |
| 7,170,561 B2 * | 1/2007 | Winger et al. .............. | 348/448 |
| 7,215,375 B2 * | 5/2007 | Chen et al. ................. | 348/448 |
| 2006/0146188 A1 * | 7/2006 | Estrop ........................ | 348/448 |

* cited by examiner

*Primary Examiner*—David Ometz
*Assistant Examiner*—Jean W. Désir
(74) *Attorney, Agent, or Firm*—Birch, Stewart, Kolash & Birch, LLP

(57) ABSTRACT

A method for motion vector de-interlacing decodes macro blocks in a picture, calculates motion vectors of the each MB, produces de-interlacing flag according to the threshold, realizes a Temporal Extension action and performs a Devour action. The Temporal Extension action checks multiple flag buffers, determines if a de-interlace flag should be set as WEAVE or BOB2 based on whether there exists a predetermined number of BOB flags in those flag buffers The Devour action determines if the de-interlace flag is BOB. If positive, it calculates the amount of BOB data within a predetermined area around the current MB, determines if the result is smaller than the BOB threshold and sets the de-interlace flag as WEAVE. Otherwise, it calculates the amount of the WEAVE data, determines if the result is smaller than the WEAVE threshold and sets the de-interlace flag as BOB2.

7 Claims, 6 Drawing Sheets

METHOD FOR MOTION VECTOR DE-INTERLACING

This Nonprovisional application claims priority under 35 U.S.C. § 119(a) on Patent Application No(s). 093100846 filed in TAWIAN, R.O.C. on Jan. 13, 2004, the entire contents of which are hereby incorporated by reference.

FIELD OF THE INVENTION

The present invention is directed to a method for motion vector de-interlacing, and more particularly, to a method for decoding MPEG-2 images.

BACKGROUND OF THE INVENTION

Recently, multimedia is easy to obtain for people. The source of multimedia can be, for example, a television program, a movie, a video compact disk (VCD), or a digital video disk (DVD). In these sources, the images mainly have two categories. One is non-interlaced images, which are shown line by line, and the other is interlaced images, which are shown in alternate lines. These images are primarily decoded in accord with the MPEG-2 standard.

In the process for encoding/decoding MPEG-2 images, one general processing method is to de-interlace the content of the interlaced film. Of these, WEAVE and BOB methods are common ways for de-interlacing. The WEAVE method merges two information fields to form a frame and the BOB method use a single information field to form a frame.

Obviously, the frame formed via the WEAVE method has more information and is clearer. The frame formed via the BOB method is more vague and some static portions will jiggle, such as the logo of the television station.

Certainly, the WEAVE method also has drawbacks. While macro block (MB) data are interlaced, the motions portions in the frame formed via the WEAVE method usually have some flaws with comb shapes, which are called mice teeth.

To a certain extent, the advantages of these two methods can be combined. The BOB method is used to eliminate the mice teeth in the motion portions and the WEAVE method is used to make the static portions clearer. This kind of method is called motion adaptive de-interlacing.

The algorithm disclosed in U.S. Pat. No. 6,269,484, named "method and apparatus for de-interlacing interlaced content using motion vectors in compressed video stream," employs motion vectors and some motion estimation remains of an MPEG stream to determine if an MB is active. In fact, the motion estimation algorithm employed in the MPEG decoder is used to search for an MB most similar to a reference picture to obtain the optimum compression ratio. In other words, the motion estimation algorithm isn't used to determine if a current MB is originally active. Hence, simply using some results obtained via this algorithm, e.g. the motion vectors and motion estimation remains of the MPEG stream, to determine if a current MB is active is not reliable.

Reference is made to FIG. 1, which is a block diagram of a conventional de-interlacing system for de-interlacing interlaced content using motion vectors in a compressed video stream. FIG. 1 is a representative diagram of the U.S. patent mentioned above, which includes: an MPEG-2 interlaced picture data encoder 10, an encoded compressed MPEG-2 video stream 102, an MPEG-2 de-interlacing device 104, an MPEG-2 data stream decoder 106, an MPEG-2 decoder with motion vector extractor 108, a motion vector based deinterlacing determinator 110, a motion vector based de-interlacing bitmap 112, a block data subset 114, decoding motion vector data 116, picture data 118, a de-interlacing video rendering unit using motion vector based de-interlacing bitmap 120 and a progressive display 122.

The MPEG-2 interlaced picture data encoder 10 is an MPEG-2 encoder, which is used for decoding the interlaced picture data according-to MPEG-2 standard and passing the encoded compressed MPEG-2 video stream 102 to the MPEG-2 de-interlacing device 104. The MPEG-2 de-interlacing device 104 includes the MPEG-2 data stream decoder 106 and de-interlacing video rendering unit using motion vector based de-interlacing bitmap 120. The MPEG-2 data stream decoder 106 includes the MPEG-2 decoder with motion vector extractor 108, motion vector based de-interlacing determinator 110 and motion vector based de-interlacing bitmap 112.

The MPEG-2 decoder with motion vector extractor 108 generates the block data subset 114 and decoding motion vector data 116 during decoding and passes them to the motion vector based de-interlacing determinator 110. The motion vector based de-interlacing determinator 110 produces the motion vector based de-interlacing bitmap 112, which has two bits provided to indicate if each MB of a picture is a motion portion or motionless portion.

The MPEG-2 decoder with motion vector extractor 108 produces and passes the picture data 118 to the de-interlacing video rendering unit using motion vector based de-interlacing bitmap 120. Then, the processed picture is shown on the progressive display 122.

Accordingly, the conventional de-interlacing system and method mentioned above still have some drawbacks that could be improved. The present invention aims to resolve the drawbacks in the prior art.

SUMMARY OF THE INVENTION

An objective of the present invention is to provide a method for motion vector de-interlacing that can resolve the drawbacks in the prior art.

For reaching the objective above, the present invention employs the information of motion vectors in an encoding/decoding video stream to determine the motion of MBs. The present invention uses the continuity and relativity of the motion to add a Temporal Extension module and a Devour module to make the determination more conservative so as to reduce mice teeth.

Numerous additional features, benefits and details of the present invention are described in the detailed description, which follows.

BRIEF DESCRIPTION OF THE DRAWINGS

The foregoing aspects and many of the attendant advantages of this invention will be more readily appreciated as the same becomes better understood by reference to the following detailed description, when taken in conjunction with the accompanying drawings, wherein:

FIGS. 4-1 and 4-2 illustrate a flowchart for generating de-interlacing flags for field picture structure video stream in accordance with the present invention.

DETAILED DESCRIPTION

Figure 3:
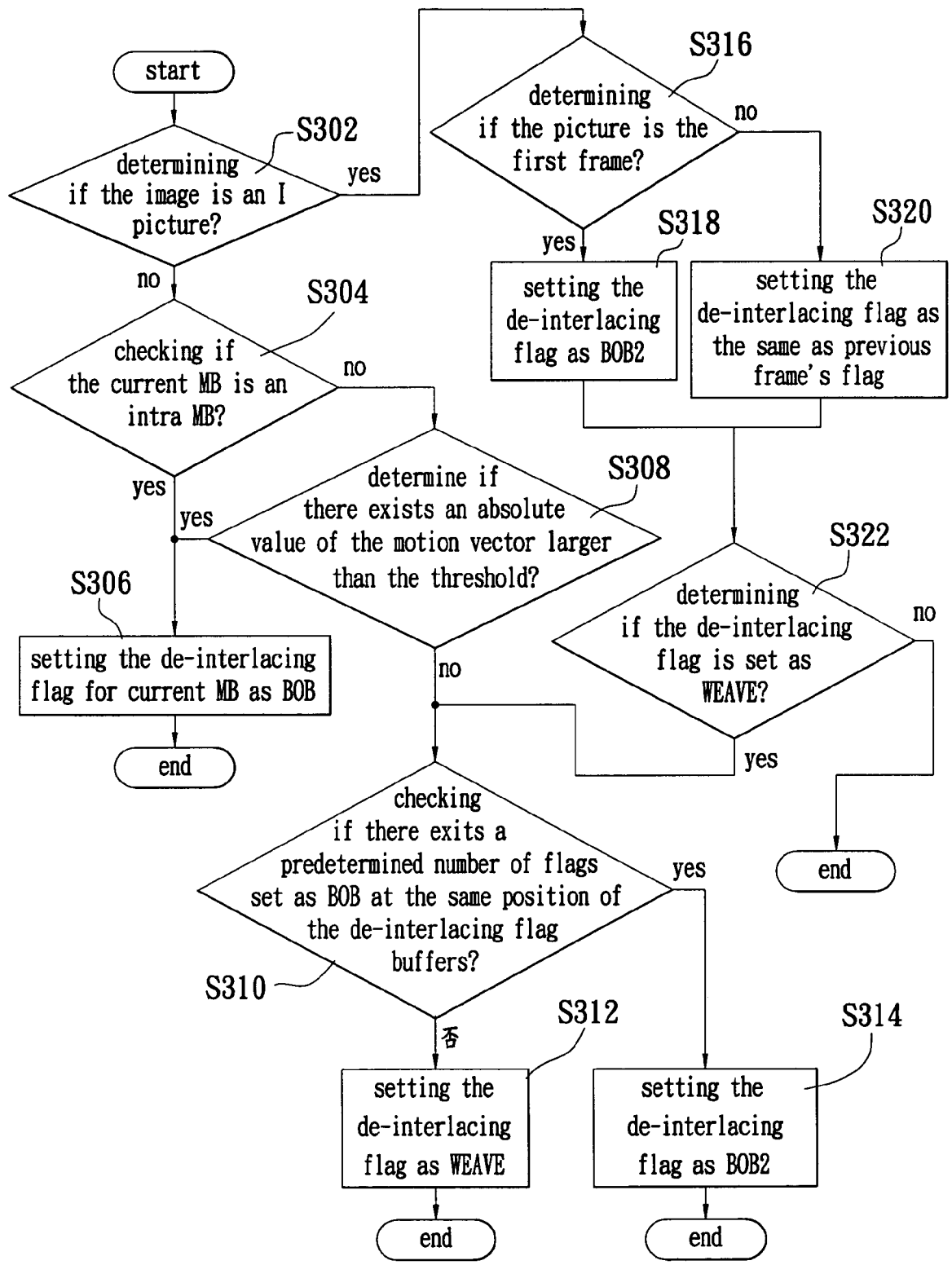
FIG. 3 is a flowchart for generating de-interlacing flags and performing Temporal Extension action for frame picture structure video stream in accordance with the present invention.
Figures 1, 4:
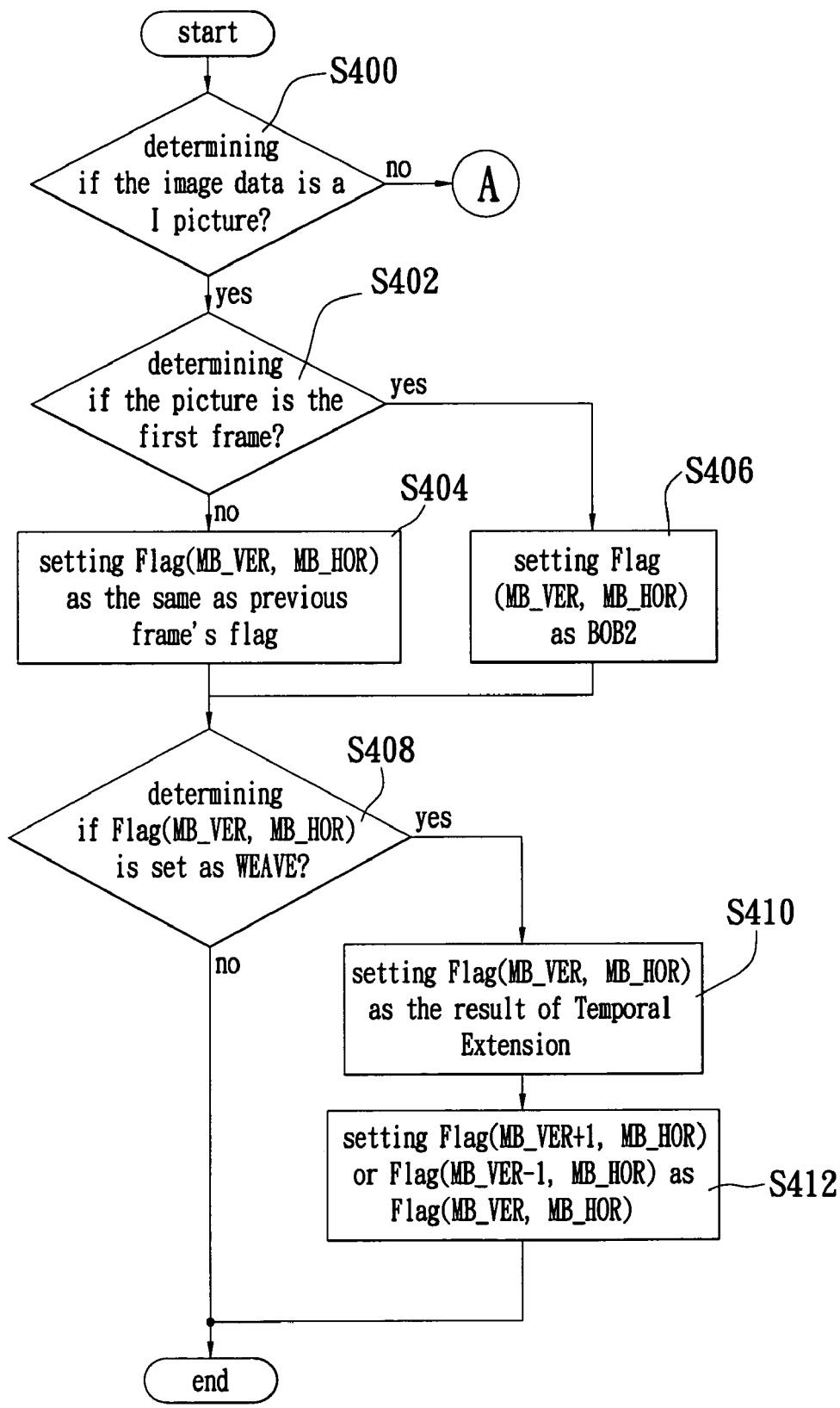
Figures 2, 4:
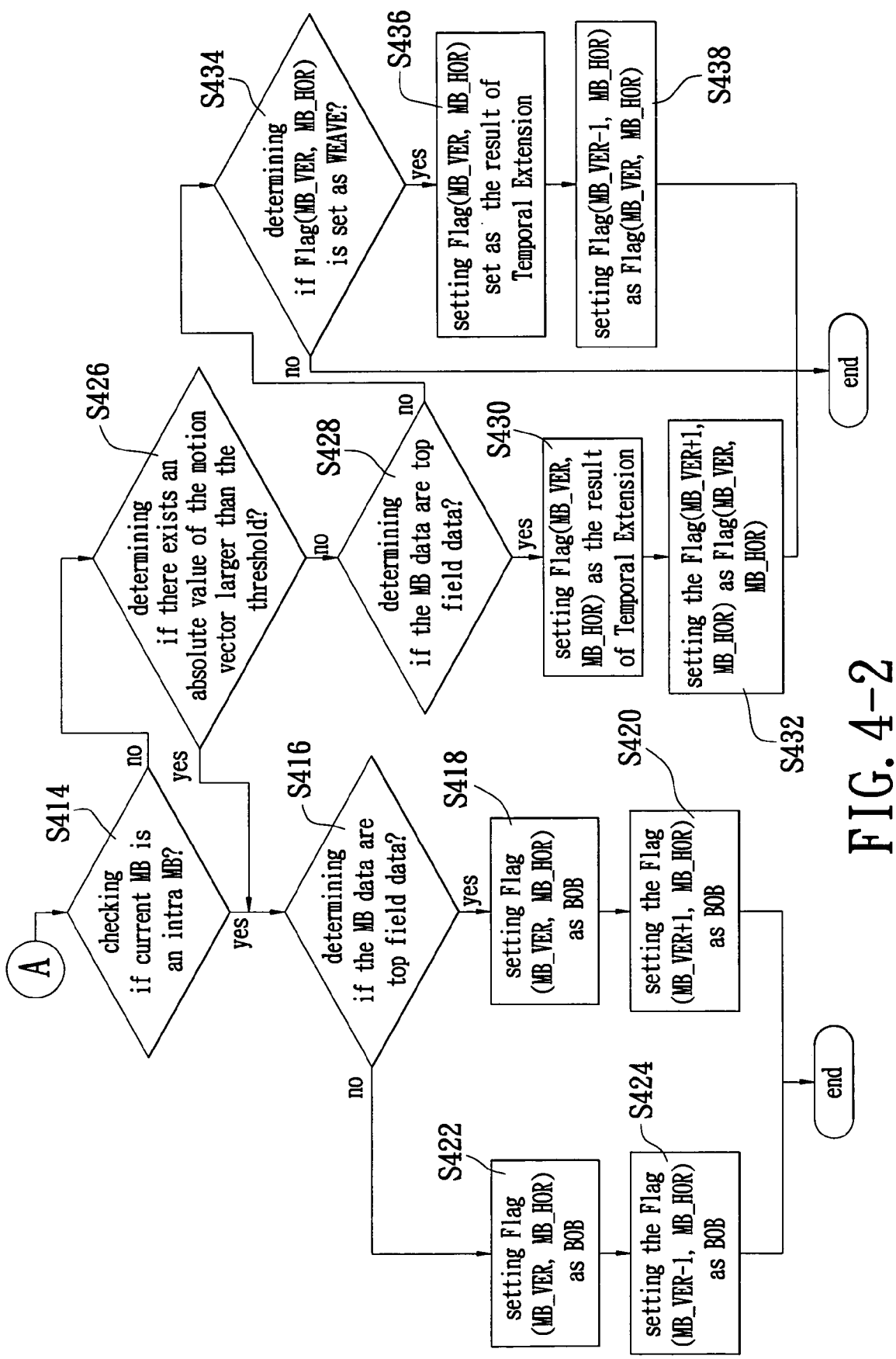
Figure 5:
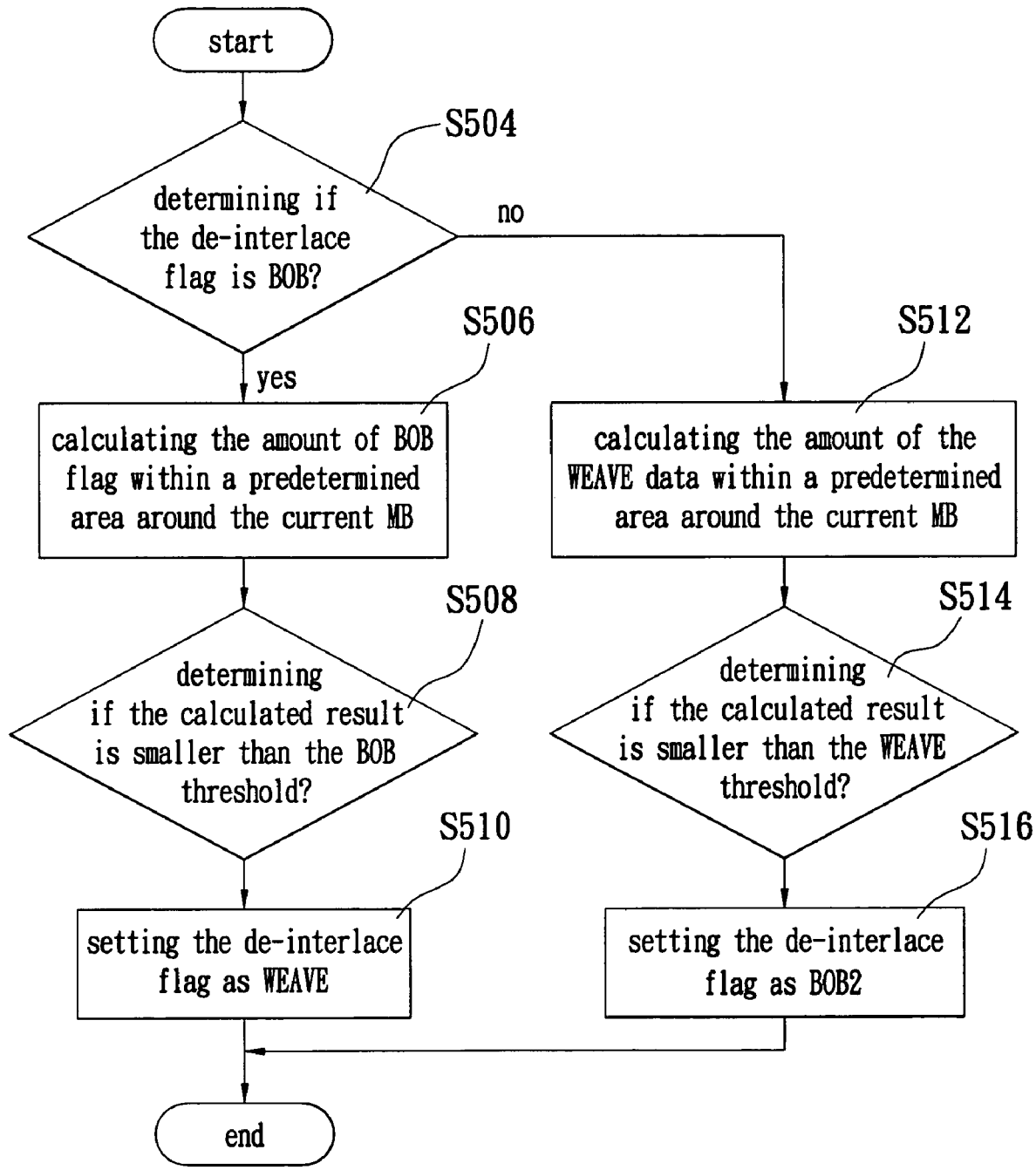
FIG. 5 is a flowchart for performing Devour action in accordance with the present invention.

Generally, there exists several frame buffers to store the decoded image data, and the same number of de-interlacing flag buffers respectively corresponding to the frame buffers will be set to store the de-interlacing flags. Following figures from FIG. 3 to FIG. 5 is applied to each MB right after it's decoding. By the way, top field first is assumed in following description.

Figure 2:
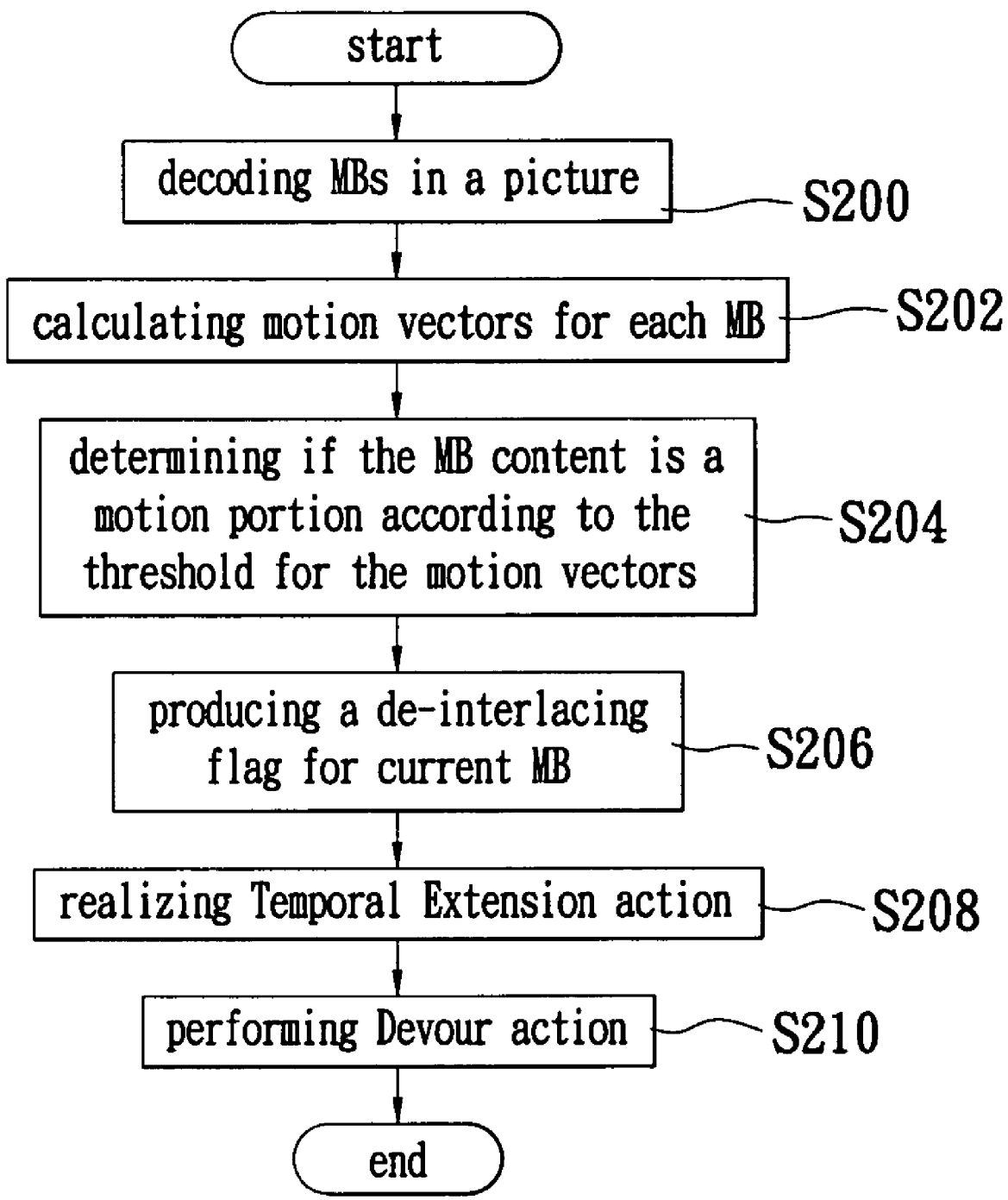
FIG. 2 is a flowchart of a method for motion vector de-interlacing in accordance with the present invention.

Reference is made to FIG. 2, which is a flowchart of a method for motion vector de-interlacing in accordance with the present invention. The method includes: decoding MBs in a picture (S200); calculating motion vectors for each MB (S202); determining if the MB content is a motion portion according to the threshold for the motion vectors (S204); if the determined result is positive, producing a de-interlacing flag for current MB (S206); realizing Temporal Extension action (S208); and performing Devour action (S210).

Reference is made to FIG. 3, which is a flowchart for generating de-interlacing flags and performing Temporal Extension action for frame picture structure video stream in accordance with the present invention. The flowchart includes: determining if the image is an I picture (S302); if negative, checking if the current MB is an intra MB (S304); if positive, set the de-interlacing flag for current MB as BOB (S306).

If the determination of step S302 is positive, the method further determines if the picture is the first frame (S316); if positive, the de-interlacing flag is set as BOB2 (S318). Otherwise, the de-interlacing flag is set to be the same as the previous decoded frame's flag (S320). The method determines if the de-interlacing flag is set as WEAVE (S322); if negative, this procedure ends. Otherwise, the method checks if there exits a predetermined number of flags set as BOB at the same position of the de-interlacing flag buffers (S310); if positive, the de-interlacing flag is set as BOB2 (S314). Otherwise, the de-interlacing flag is set as WEAVE (S312).

If the determination of step S304 is negative, further determination is made as to whether there exists an absolute value of the motion vector larger than the threshold (S308); if positive, the de-interlacing flag is set as BOB (S306). Otherwise, the method checks if there exits a predetermined number of flags set as BOB at the same position of the de-interlacing flag buffers (S310); if positive, the de-interlacing flag is set as BOB2 (S314). Otherwise, the de-interlacing flag is set as WEAVE (S312). Further, steps S310, S312, S314 can be used as a Temporal Extension method for step S410 in FIG. 4 as described below.

Figure 1:
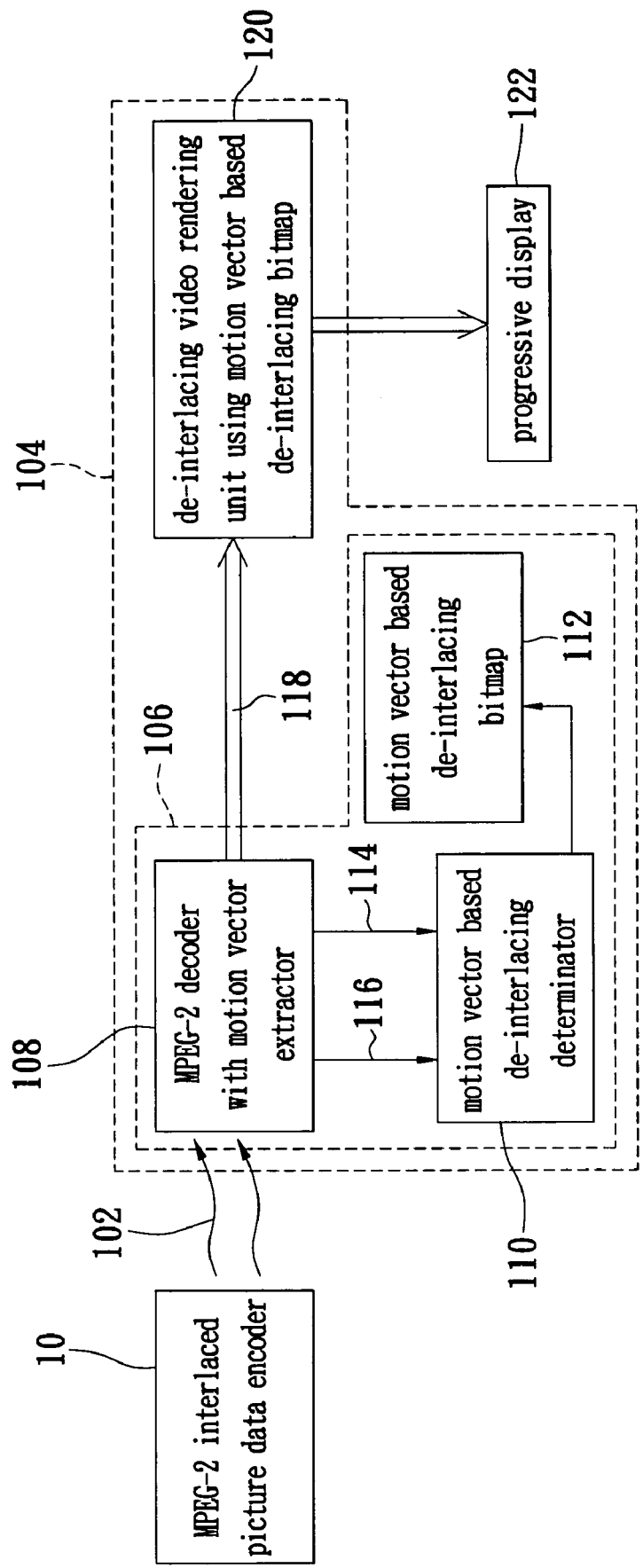
FIG. 1 is a block diagram of a conventional de-interlacing system for de-interlacing interlaced content using motion vectors in compressed video stream.

Reference is made FIGS. 4-1 and 4-2, which illustrate a flowchart for generating de-interlacing flags for field picture structure video stream in accordance with the present invention. The flowchart includes determining if the image data is an I picture (S400); if positive, whether the picture is the first frame is determined (S402); if positive, the de-interlacing flag, which can be indicated as Flag(MB_VER, MB_HOR), is set as BOB2 (S406). Otherwise, Flag(MB_VER, MB_HOR) is set to be the same as the previous frame's flag (S404). The method determines if Flag(MB_VER, MB_HOR) is set as WEAVE (S408); if negative, this procedure end. Otherwise, Flag(MB_VER, MB_HOR) is set as the result of Temporal Extension (S410) and Flag(MB_VER+1, MB_HOR) or Flag(MB_VER−1, MB_HOR) is set as Flag(MB_VER, MB_HOR) (S412).

If the determination of step S400 is negative, the method checks if current MB is an intra MB (S414); if positive, whether the MB data is top field data is determined (S416); if positive, Flag(MB_VER, MB_HOR) is set as BOB (S418) and the Flag(MB VER+1, MB_HOR) is set as BOB (S420). Otherwise, Flag(MB_VER, MB_HOR) is set as BOB (S422) and the Flag(MB_VER−1, MB_HOR) is set as BOB (S424).

If the determination of step S414 is negative, the method determines if there exists an absolute value of the motion vector larger than the threshold (S426); if positive, the method determines if the MB data are top field data (S416). If positive, Flag(MB_VER, MB_HOR) is set as BOB (S418) and the Flag(MB_VER+1, MB_HOR) is set as BOB (S420). Otherwise, Flag(MB_VER, MB_HOR) is set as BOB (S422) and the Flag(MB_VER−1, MB_HOR) is set as BOB (S424).

If the determination of step S426 is negative, the method determines if the MB data are top field data (S428). If positive, Flag(MB_VER, MB_HOR) is set as the result of Temporal Extension(S430) and the Flag(MB_VER+1, MB_HOR) is set as Flag(MB_VER, MB_HOR) (S432). Otherwise, the method determines if Flag(MB_VER, MB_HOR) is set as WEAVE (S434); if negative, this procedure ends. Otherwise, Flag(MB_VER, MB_HOR) is set as the result of Temporal Extension (S436) and Flag (MB_VER−1, MB_HOR) is set as Flag(MB_VER, MB_HOR) (S438).

Reference is made to FIG. 5, which is a flowchart for performing Devour action in accordance with the present invention. And the Devour action will be only performed after the related de-interlacing flags are ready. The flowchart includes steps as follows. For each de-interlacing flag ready for Devour action, the following action will be performed: whether the de-interlace flag is BOB is determined (S504); if positive, the amount of BOB flags within a predetermined area around the current MB is calculated (S506). Whether the calculated result is smaller than the BOB threshold is determined (S508). The de-interlace flag is set as WEAVE (S510).

If the determination of Step S504 is negative, the amount of the WEAVE data within a predetermined area around the current MB is calculated (S512). Whether the calculated result is smaller than the WEAVE threshold is determined (S514) and the de-interlace flag is set as BOB2 (S516).

Although the present invention has been described with reference to the preferred embodiment thereof, it will be understood that the invention is not limited to the details thereof. Various substitutions and modifications have been suggested in the foregoing description, and other will occur to those of ordinary skill in the art. Therefore, all such substitutions and modifications are embraced within the scope of the invention as defined in the appended claims.

What is claimed is:

1. A method for motion vector de-interlacing, comprising:
   decoding macro blocks (MBs) in a picture;
   calculating motion vectors of a current MB;
   producing a de-interlacing flag corresponding to the current MB according to a threshold;
   realizing a Temporal Extension action via performing Temporal Extension between the flags in a same position in the do-interlacing flag buffers; and
   performing a Devour action via devouring isolated de-interlacing flags and associating the isolated de-interlacing flags with each other in motion.

2. The method as claimed in claim 1, wherein the picture content is a motionless picture or a motion picture.

3. The method as claimed in claim 1, wherein the step of realizing the Temporal Extension action further comprises:

determining if the current de-interlace flag is set as WEAVE;

determining if a predetermined number of the flags in the other flag buffers are set as BOB; and setting the de-interlace flags as BOB2.

4. The method as claimed in claim 1, wherein the step of performing the Devour action further comprises:

calculating the amount of BOB flags within a predetermined area around the current MB to form a first calculated result; and setting the de-interlace flag as WEAVE.

5. The method as claimed in claim 4, wherein the step comprises:

determining if the current de-interlace flag is set as BOB.

6. The method as claimed in claim 5, further comprising the following steps if a determination result of determining if the de-interlace flag is set as BOB is negative:

calculating an amount of WEAVE data within a predetermined area around the current MB to form a second calculated result;

determining if the second calculated result is smaller than a WEAVE threshold; and setting the de-interlace flags as BOB2.

7. The method as claimed in claim 4, wherein the step of calculating further comprises:

determining if the first calculated result is smaller than a BOB threshold.

* * * * *